United States Patent
Kena et al.

(10) Patent No.: US 10,336,164 B1
(45) Date of Patent: Jul. 2, 2019

(54) SUN VISOR ASSEMBLY

(71) Applicant: FORD GLOBAL TECHNOLOGIES, LLC, Dearborn, MI (US)

(72) Inventors: Mukdam Kena, Sterling Heights, MI (US); Michael Murphy McElroy, South Lyon, MI (US); John Andrew Stakoe, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/851,260

(22) Filed: Dec. 21, 2017

(51) Int. Cl.
*B60J 3/02* (2006.01)

(52) U.S. Cl.
CPC ............. *B60J 3/0234* (2013.01); *B60J 3/023* (2013.01); *B60J 3/0217* (2013.01)

(58) Field of Classification Search
CPC ....... B60J 3/0213; B60J 3/0217; B60J 3/0234
USPC ...................................................... 296/97.11
See application file for complete search history.

(56) References Cited

U.S. PATENT DOCUMENTS

| | | | | |
|---|---|---|---|---|
| 3,767,256 A | * | 10/1973 | Sarkees | B60J 3/0217 248/289.11 |
| 5,000,506 A | * | 3/1991 | Abu-Shumays | B60J 3/0208 296/97.4 |
| 5,044,687 A | * | 9/1991 | Abu-Shumays | B60J 3/0208 296/97.11 |
| H1834 H | * | 2/2000 | Wilson | 296/97.11 |
| 7,461,887 B1 | * | 12/2008 | Federle | B60J 3/0234 296/97.4 |
| 2010/0090494 A1 | | 4/2010 | Marcus et al. | |

FOREIGN PATENT DOCUMENTS

| | | |
|---|---|---|
| EP | 2241464 A1 | 10/2010 |
| GB | 2244964 A | 12/1991 |
| JP | 2000052765 A | 2/2000 |
| JP | 2004161149 A | 6/2004 |
| JP | 2006021729 A | 1/2006 |
| JP | 04497461 B2 | 7/2010 |
| KR | 2007060409 A | 6/2007 |

OTHER PUBLICATIONS

English Machine Translation of EP2241464A1.
English Machine Translation of JP04497461B2.
English Machine Translation of JP2000052765A.
English Machine Translation of JP2004161149A.
English Machine Translation of JP2006021729A.
English Machine Translation of KR2007060409A.

* cited by examiner

*Primary Examiner* — Dennis H Pedder
(74) *Attorney, Agent, or Firm* — Vichit Chea; King & Schickli, PLLC

(57) ABSTRACT

A sun visor assembly comprises a support rod displaceable between a first position, extending along a windshield, and a second position extending along a side window. A visor body is carried on the support rod. A cam is configured to displace the visor body along the support rod from a home position to an extended position as the support rod is displaced toward the second position. A sun visor operating method and method of educating an operator with respect to a capability of a visor body to slide along a support rod are also disclosed.

18 Claims, 9 Drawing Sheets

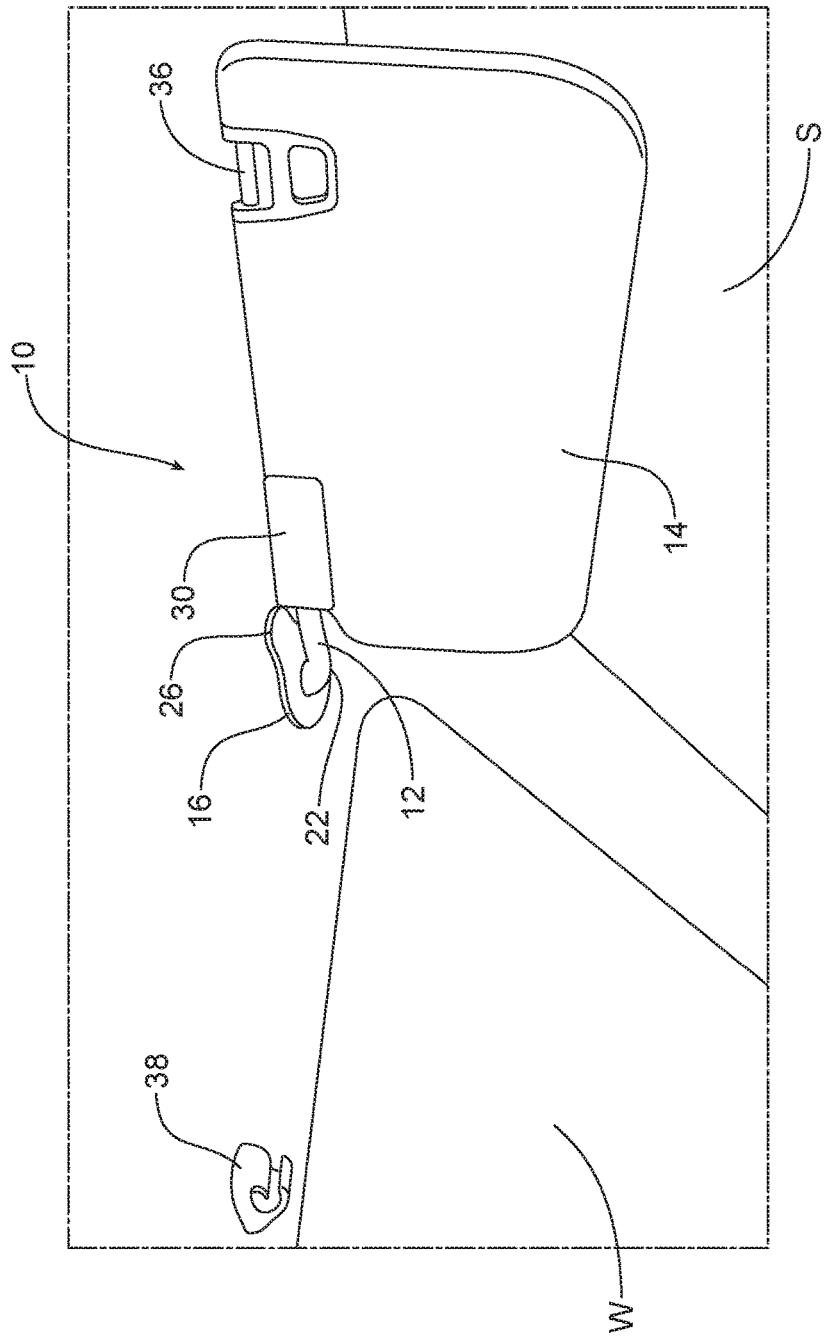

SUN VISOR ASSEMBLY

TECHNICAL FIELD

This document relates generally to the motor vehicle equipment field and, more particularly, to a sun visor assembly that includes a cam configured to displace the visor body along the support rod of the sun visor assembly from a home position to an extended position as that support rod is displaced toward the side window.

BACKGROUND

Sun visors are installed in motor vehicles in an effort to shield the driver and passenger's eyes from sunlight that might otherwise interfere with the chosen sight path outside the motor vehicle. Typically, a sun visor assembly includes a sun visor that is displaceable between a stowed position resting against the headliner of the motor vehicle, a first deployed position resting adjacent a windshield of the motor vehicle to shield sunlight directed through the windshield and a second deployed position resting along the side window of the motor vehicle to shield sunlight directed though the side window.

Toward this end, a sun visor assembly typically includes a support rod that may be pivoted between a first position, extending along the windshield and a second position, extending along the side window as well as a visor body that may be rotated about the support rod. In some embodiments, the visor body may include yet another degree of freedom allowing the visor body to slide along the length of the support rod. This allows one to extend the visor body to reach across the side window glass toward the B pillar of the motor vehicle when the visor body is in the second deployed position. This lengthwise adjustment often allow the user to position the visor body more effectively for screening the eyes from sunlight through the side window.

This document relates to a new and improved sun visor assembly incorporating a built-in or integral cam configured to displace the visor body along the support rod from a home position to an extended position when the support body is displaced toward the second position. This positions the visor body in a better position to more effectively screen and shield the eyes of the operator from sunlight coming through the side window while also effectively educating the operator with respect to the capability of the visor body to slide along the support rod. This latter convenience feature is often unknown to a motor vehicle operator.

SUMMARY

In accordance with the purposes and benefits described herein, a new and improved sun visor assembly is provided. That sun visor assembly comprises a support rod, a visor body and a cam. The support rod is displaceable between a first position, extending along a windshield of the motor vehicle (i.e. substantially parallel to the lateral or Y-axis of the motor vehicle under the SAE vehicle axis system) and a second position extending along a side window of the motor vehicle (i.e. substantially parallel to the longitudinal or X-axis of the motor vehicle under the SAE vehicle axis system). The visor body is carried on the support rod. The cam is configured to displace the visor body along the support rod from a home position to an extended position as the support rod is displaced from the first position toward the second position.

The support rod may include a proximal end and a distal end. The proximal end is connected to the motor vehicle while the distal end carries the visor body. Thus, the support rod has a cantilevered configuration.

The sun visor assembly may further include a cover concealing the proximal end of the support rod. The cam may be integrated into the cover or at least partially concealed by the cover. The cam may include a projecting ear. That projecting ear may extend substantially parallel to the longitudinal axis of the motor vehicle as defined by the SAE vehicle access system. The projecting ear may have a length of between 5 mm and 18 mm. In some embodiments, the projecting ear may have a length of between 8 mm and 15 mm. In other embodiments, the projecting ear may have a length of 11 mm to 12 mm.

The cam may include an arcuate cam surface. Further, the sun visor assembly may include a cam follower carried on the visor body. That cam follower may engage and slide along the arcuate cam surface of the cam as the support rod is displaced from the first position to the second position. The support rod may include an elbow adjacent the proximal end.

In accordance with an additional aspect, a sun visor operating method is provided. That sun visor operating method comprises automatically displacing a visor body along a support rod from a home position to an extended position as the support rod is displaced from a first position, extending along a windshield, toward a second position extending along a side window of a motor vehicle.

The method may further include the step of engaging a cam follower on the visor body with a fixed cam as the support rod is displaced from the first position to the second position in order to displace the visor body along the support rod toward the extended position. In addition the method may include the step of manually returning the visor body to the home position.

Still further, the method may include educating an operator as to a capability of the visor body to slide along the support rod between the home position and the extended position. Still further the method may include the step of providing the cam with a projecting ear extending substantially parallel to a longitudinal axis of the motor vehicle.

In accordance with yet another aspect, a method is provided of educating an operator with respect to a capability of a visor body to slide along a support rod. That method includes the step of automatically displacing the visor body along the support rod when displacing the support rod from a first position to a second position. Further, the method may include sliding a cam follower on the visor body along a fixed cam as the visor body is displaced into the second position extending along a side window of a motor vehicle.

In the following description, there are shown and described several preferred embodiments of the sun visor assembly as well as the sun visor operating method and method of educating an operator with respect to a capability of a visor body to slide along a support rod. As it should be realized, the sun visor assembly and related methods are capable of other, different embodiments and their several details are capable of modification in various, obvious aspects all without departing from the sun visor assembly and methods as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the sun visor assembly and related methods and together with the description serve to explain certain principles thereof. In the drawing figures:

FIG. 1d is a perspective view of the sun visor assembly with the visor body in the second deployed position rotated to extend along the side window.

Reference will now be made in detail to the present preferred embodiments of the sun visor assembly and related methods, examples of which are illustrated in the accompanying drawing figures.

DETAILED DESCRIPTION

Figure 1A:
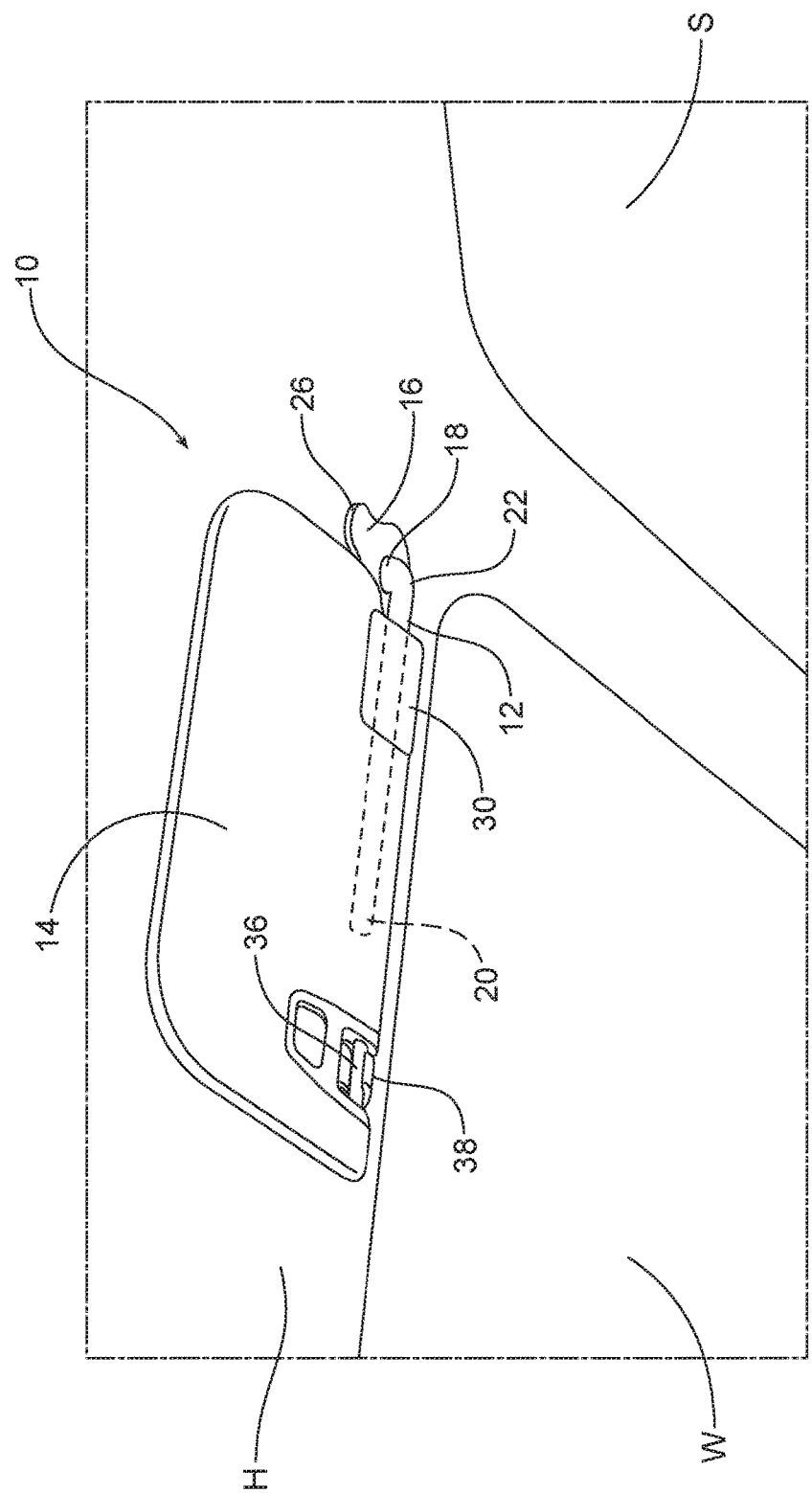
FIG. 1a is perspective view of the sun visor assembly with the visor body in the stowed position against the headliner.
Figure 1B:
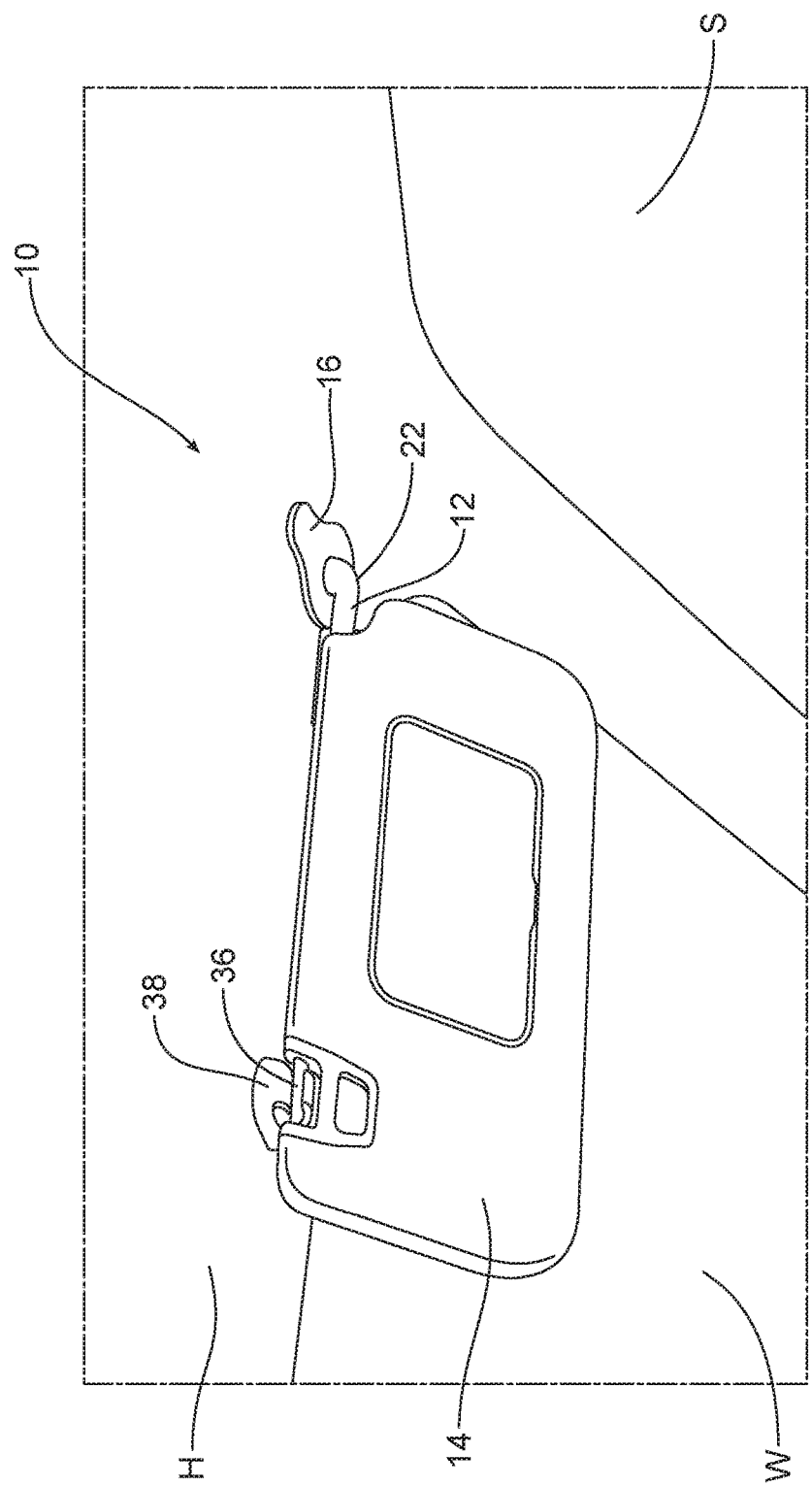
FIG. 1b is a view of the sun visor assembly with the visor body in the first deployed position rotated toward the windshield.

Reference is now made to FIGS. 1a-1d, 2 and 3a-3d illustrating the new and improved sun visor assembly 10. That sun visor assembly 10 includes a support rod 12, a visor body 14 carried on the support rod and a cam 16. The support rod 12 is displaceable between a first position, extending along a windshield W of a motor vehicle as illustrated in FIGS. 1a and 1b and a second position, extending along a side window S of a motor vehicle as illustrated in FIG. 1d. The cam 16 is fixed to the motor vehicle and is configured to displace the visor body 14 along the support rod 12 from a home position to an extended position as the support rod is displaced toward the second position from the first position. Thus, the cam 16 functions as a passive visor body-extending travel guide.

In the stowed position illustrated in FIG. 1a, the visor body 14 rests relatively flat along the headliner H where it is completely out of the way and it does not in any way interfere with the view through the windshield W. In the first deployed position illustrated in FIG. 1b, the visor body 14 is rotated toward and extends downward across the upper portion of the windshield W in a position where it can shield the eyes of the user from the light of the sun when the sun is low in the sky and the user is looking forward through the windshield. In the second deployed position illustrated in FIG. 1d, the support rod 12 is pivoted toward the side of the motor vehicle and the visor body 14 extends downward across the top of the side window S where it can shield the light of the sun from coming through the upper part of the side window and interfering with the vision of the user when the sun is directed toward the side of the motor vehicle.

Figure 2:
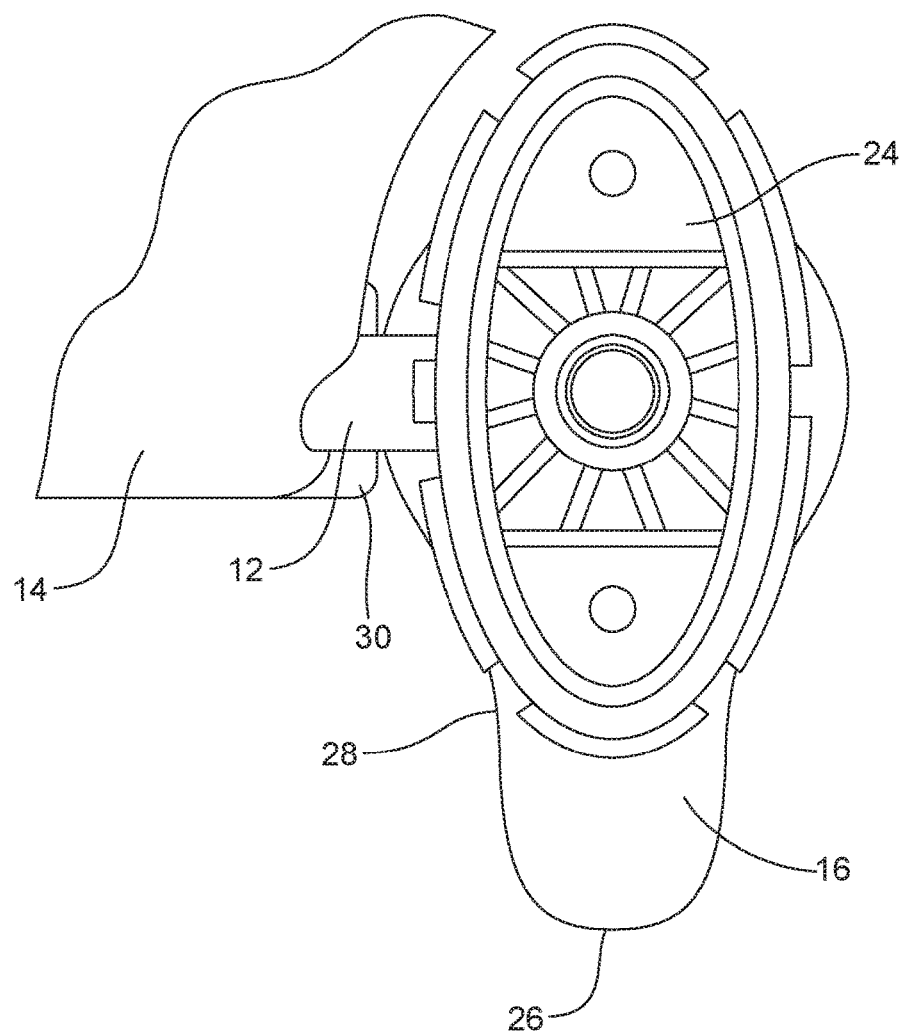
FIG. 2 is a detailed plan view illustrating the cover of the visor assembly at the proximal end of the support rod that hides a substantial portion of the cam from view.

The support rod 12 includes a proximal end 18 and a distal end 20. The proximal end 18 is pivotally connected to the motor vehicle while the visor body 14 is received over and carried on the distal end 20. Thus, the support rod 12 has a cantilevered configuration. An elbow 22 is provided in the support rod 12 adjacent the proximal end 18. As best illustrated in FIG. 2, a cover 24 is received over the proximal end 18 and may conceal a substantial portion of the underlying cam 16. That cam 16 may be integrated into the cover 24 and may even be made integral therewith as a single piece if desired. Note, the cover 24 is removed for clarity to show cam 16 in the other drawing figures.

As best illustrated in FIGS. 3a-3d, the cam 16 includes a projecting ear 26. The projecting ear 26 extends substantially parallel to the longitudinal or X-axis of the motor vehicle as defined by the SAE vehicle axis system. The projecting ear 26 may have a length of between 5 mm and 18 mm. In some embodiments, the projecting ear may have a length of between 8 mm and 15 mm. In some embodiments the projecting ear 26 may have a length of 11 mm to 12 mm. In still other embodiments, the projecting ear 26 may have a length dimension outside of these ranges. Thus, these ranges should not be considered limiting in scope.

Figure 1C:
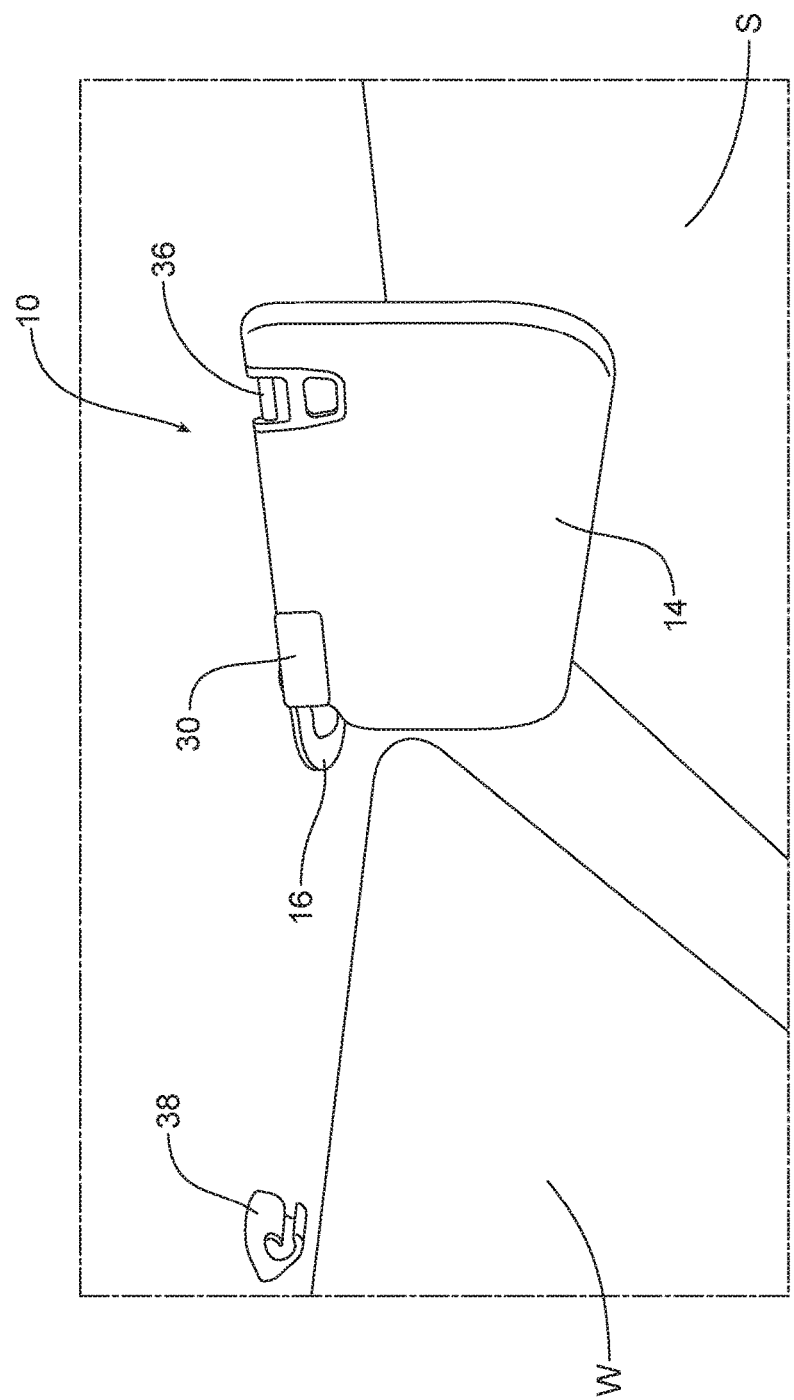
FIG. 1c is a perspective view of the sun visor assembly with the visor body in an intermediate position between the first deployed position and the second deployed position.
Figure 3A:
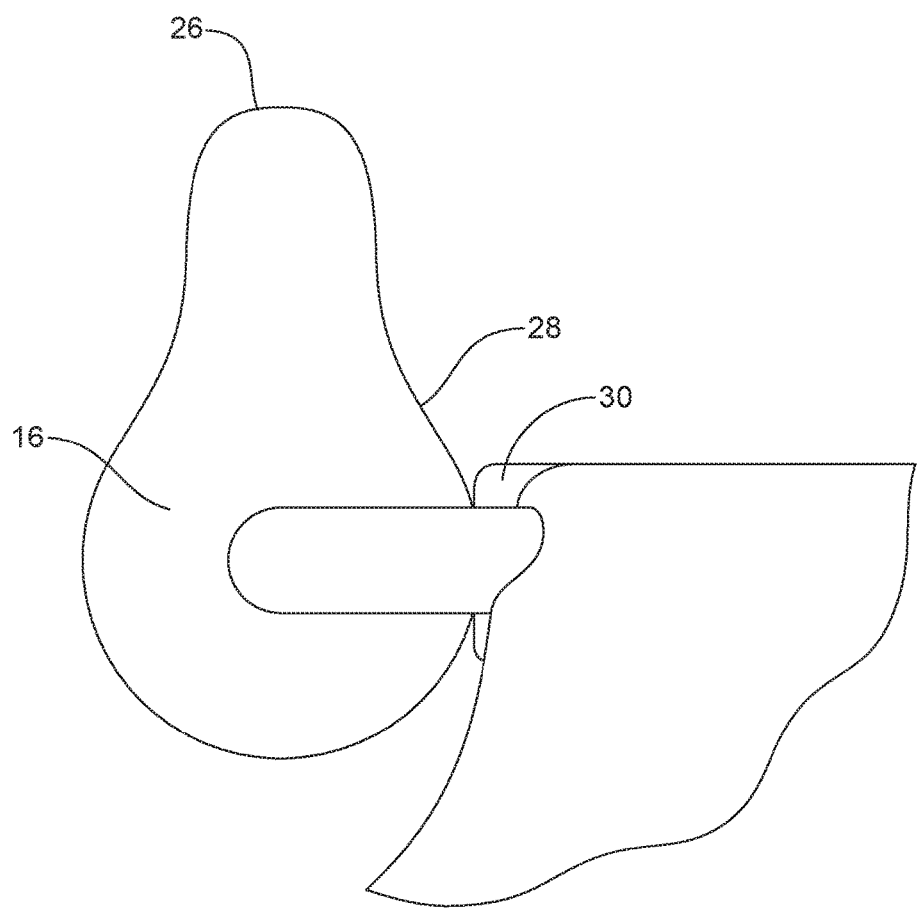
FIGS. 3a-3d are a series of detailed views illustrating the movement of the cam follower on the visor body along the cam as the visor body is displaced from the stowed position illustrated in FIG. 3a to a first deployed position illustrated in FIG. 3b, then to an intermediate position illustrated in FIG. 3c and a second deployed position illustrated in FIG. 3d.
Figure 3B:
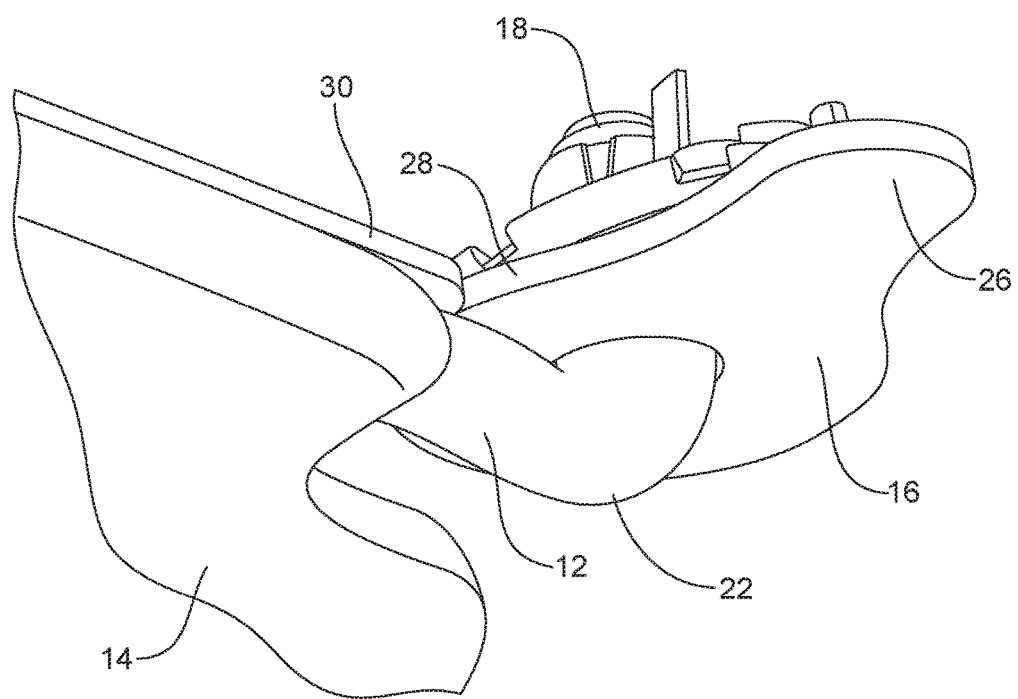
Figure 3C:
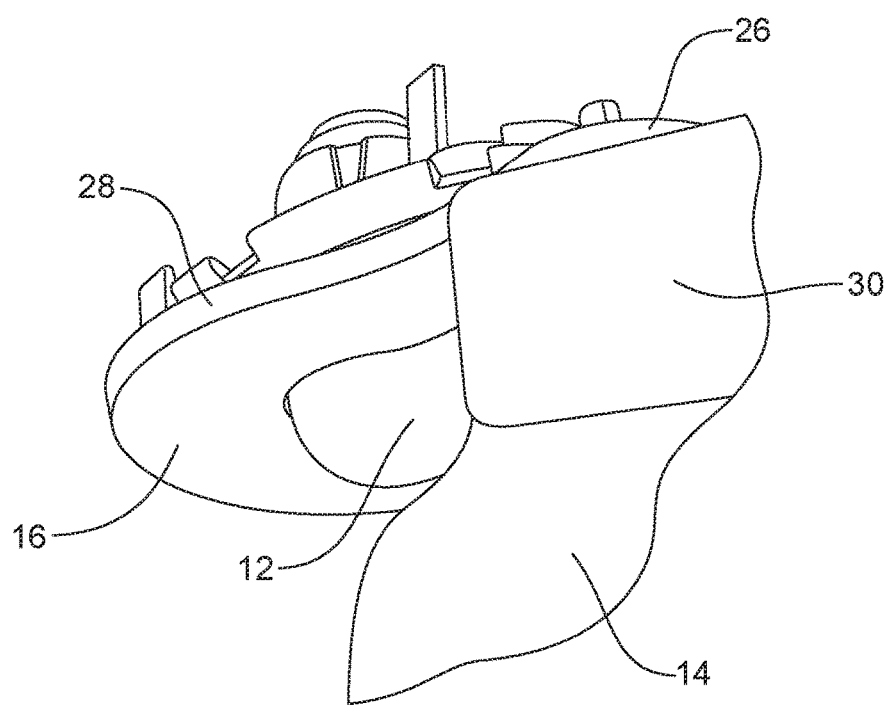
Figure 3D:
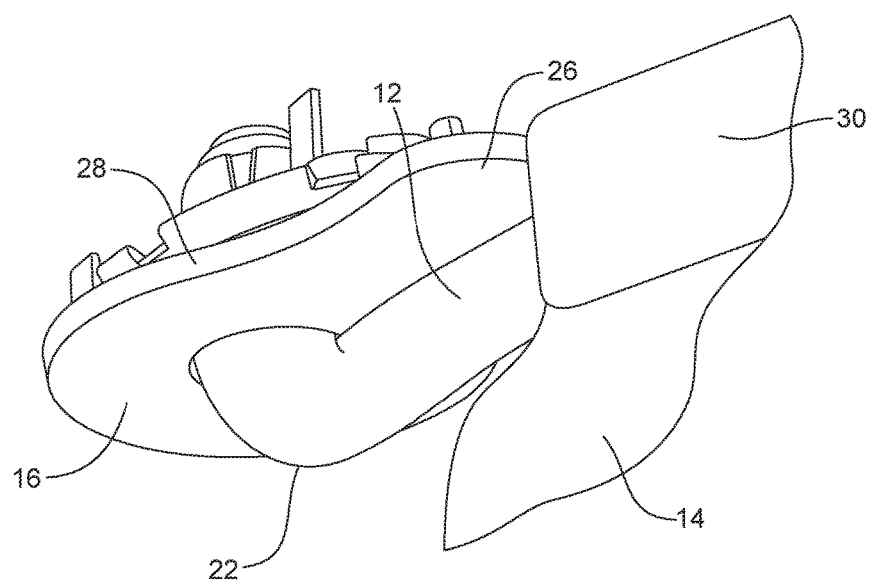

As should also be appreciated, the cam 16 includes an arcuate cam surface 28 defined along the edge of the cam 16 including the projecting ear 26. A cam follower 30 is carried on the visor body 14. The cam follower 30 engages and slides along the arcuate cam surface 28 as the support rod 12 is displaced from a first position illustrated in FIGS. 1a and 3a, wherein the visor body is in the stowed position and in FIGS. 1b and 3b when the visor body is in the first deployed position, to the second position as illustrated in FIGS. 1d and 3d when the visor body is in the second deployed position along the side window. FIGS. 1c and 3c illustrate an intermediate position between those positions illustrated in FIGS. 1b/3b and 1d/3d in order to illustrate how the cam follower 30 slides along the cam surface 28 of the cam 16 so the visor body 14 is pushed longitudinally in the direction of action arrow A along the support rod 12 away from the proximal end 18.

A first stop (not shown) provided on the support rod 12 adjacent the distal end 20 and a second stop (not shown) provided on the visor body 14 engage to prevent the visor body from sliding off the distal end of the support rod. The length of the projecting ear 26 establishes the distance the visor body 14 is extended or displaced along the support rod 12. That length may correspond to the distance needed to bring the free end of the visor body 14 substantially to engagement with the B pillar of the motor vehicle when the visor body is in the second deployed position against the side window of the motor vehicle. In this manner, the visor body 14 is displaced along the support rod 12 to the most ideal position to shield the eyes of most motor vehicle occupants in the adjacent seat.

As should be appreciated, a sun visor operating method is also provided. That sun visor operating method comprises automatically displacing the visor body 14 along the support rod 12 from a home position to an extended position as the support rod is displaced from a first position, extending along the windshield W, toward a second position extending along the side window S. Toward this end, the method includes the step of engaging a cam follower 30 provided on the visor body 14 with a fixed cam 16 as the support rod 12 is displaced from the first position to the second position in order to displace the visor body along the support rod toward the extended position. When the support rod 12 is then pivoted back to the first position, the method includes manually returning the visor body 14 to the home position on the support rod 12 by sliding the visor body toward the proximal end 18. A stop (not shown) may be provided to stop the visor body in the home position where the pin 36 is aligned with the clip 38 at the headliner H to secure the free end of the visor body 14 in position.

As should also be appreciated, the sun visor operating method may include the step of providing the cam 16 with the projecting ear 26 that extends parallel to the longitudinal or X-axis of the motor vehicle and defines the length about which the visor body 14 is displaced along the support rod 12 when the support rod is displaced from the first position to the second position. Further, the method may include the step of educating an operator as to the capability of the visor body 14 to slide along the support rod 12 between the home position and the extended position. Thus, it should be appreciated that a method of educating an operator with respect to this capability is provided. More specifically, by automatically displacing the visor body 14 along the support rod 12 when displacing the support rod from the first position to the second position, the sliding movement of the visor body is demonstrated to the operator. Further, the operator must manually return the visor body 14 to the home position in order to insert the pin 36 in the clip 38. This manual movement further reinforces the operator with knowledge of the sliding movement of the visor body 14. Accordingly, the operator may then use this information to better position the visor body 14 to shield the operator eyes from sun coming through the windshield W or the side window S as desired.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A sun visor assembly, comprising:
    a support rod displaceable between a first position, extending along a windshield, and a second position extending along a side window;
    a visor body carried on said support rod; and
    a cam configured to displace said visor body along said support rod from a home position to an extended position as said support rod is displaced toward said second position.

2. The sun visor assembly of claim 1, wherein said support rod includes a proximal end and a distal end.

3. The sun visor assembly of claim 2, wherein said proximal end is connected to a motor vehicle while distal end carries said visor body whereby said support rod has a cantilevered configuration.

4. The sun visor assembly of claim 3, further including a cover concealing said proximal end of said support rod.

5. The sun visor assembly of claim 4, wherein said cam is integrated into said cover.

6. The sun visor assembly of claim 5, wherein said cam includes a projecting ear.

7. The sun visor assembly of claim 6, wherein said projecting ear extends substantially parallel to a longitudinal axis of said motor vehicle.

8. The sun visor assembly of claim 7, wherein said projecting ear has a length of between 5 mm and 18 mm.

9. The sun visor assembly of claim 7, wherein said projecting ear has a length of between 8 mm and 15 mm.

10. The sun visor assembly of claim 7, wherein said projecting ear has a length of 11 mm to 12 mm.

11. The sun visor assembly of claim 7, wherein said cam includes an arcuate cam surface.

12. The sun visor assembly of claim 11, further including a cam follower carried on said visor body, said cam follower engaging and sliding along said arcuate cam surface as said support rod is displaced from said first position to said second position.

13. The sun visor assembly of claim 12, wherein said support rod includes an elbow adjacent said proximal end.

14. A sun visor operating method, comprising:
    automatically displacing a visor body along a support rod from a home position to an extended position as said support rod is displaced from a first position, extending along a windshield, toward a second position extending along a side window.

15. The sun visor operating method of claim 14, including engaging a cam follower on said visor body with a fixed cam as said support rod is displaced from said first position to said second position in order to displace said visor body along said support rod toward said extended position.

16. The sun visor operating method of claim 15, including manually returning said visor body to said home position.

17. The sun visor operating method of claim 16, including educating an operator as to a capability of said visor body to slide along said support rod between said home position and said extended position.

18. The sun visor operating method of claim 15, including providing said fixed cam with a projecting ear extending substantially parallel to a longitudinal axis of a motor vehicle.

* * * * *